United States Patent
Kain et al.

(10) Patent No.: US 12,246,682 B2
(45) Date of Patent: Mar. 11, 2025

(54) DEVICE AND METHOD FOR SECURING A LADDER TO A LADDER RACK

(71) Applicant: William Webster Kain, Montpelier, VA (US)

(72) Inventors: William Webster Kain, Montpelier, VA (US); Ryan Beaver, Richmond, VA (US); William Myles Riley, Henrico, VA (US)

( * ) Notice: Subject to any disclaimer, the term of this patent is extended or adjusted under 35 U.S.C. 154(b) by 462 days.

(21) Appl. No.: 17/735,883

(22) Filed: May 3, 2022

(65) Prior Publication Data

US 2022/0355742 A1     Nov. 10, 2022

Related U.S. Application Data

(60) Provisional application No. 63/184,491, filed on May 5, 2021.

(51) Int. Cl.
| | | |
|---|---|---|
| B25B 5/00 | (2006.01) | |
| B60R 9/048 | (2006.01) | |
| F16B 2/12 | (2006.01) | |

(52) U.S. Cl.
CPC .............. B60R 9/0485 (2013.01); F16B 2/12 (2013.01)

(58) Field of Classification Search
CPC .... B25B 1/00; B25B 1/14; B25B 5/00; B25B 5/082; B25B 5/067; B25B 5/101; B25B 5/125
See application file for complete search history.

(56) References Cited

U.S. PATENT DOCUMENTS

| | | | | |
|---|---|---|---|---|
| 5,628,540 | A * | 5/1997 | James | B60R 9/00 |
| | | | | 224/403 |
| 7,641,251 | B1 * | 1/2010 | Stepanians | B60P 3/40 |
| | | | | 296/3 |
| 11,731,564 | B1 * | 8/2023 | Strawn | B60R 9/00 |
| | | | | 296/3 |
| 2009/0146354 | A1 * | 6/2009 | Metroyanis | E04G 21/1891 |
| | | | | 269/74 |

(Continued)

OTHER PUBLICATIONS

Webpage for DeWalt 12" Medium Trigger Clamp, available at https://www.dewalt.com/product/dwht83140/12-medium-trigger-clamp?tid=577221, last accessed May 3, 2022, 10 pages.

(Continued)

*Primary Examiner* — Lee D Wilson
(74) *Attorney, Agent, or Firm* — Thedford I. Hitaffer; Hitaffer & Hitaffer, PLLC

(57) ABSTRACT

A device for securing a ladder to a ladder rack comprises a first pole segment, a second pole segment substantially parallel to and shorter than the first pole segment, a connecting segment therebetween, and a clamping bar slidably engaged with the first pole segment and selectively slidably engaged with the second pole segment. The clamping bar comprises a trigger handle. The device may be placed around a portion of a ladder and a ladder rack. Repeatedly pivoting and releasing the trigger handle moves the clamping bar proximally-to-distally along the first pole segment such that the clamping bar slidably engages a proximal end of the second pole segment and then tightens against the ladder rack, thereby securing the ladder to the ladder rack.

18 Claims, 5 Drawing Sheets

(56) References Cited

U.S. PATENT DOCUMENTS

| | | | |
|---|---|---|---|
| 2011/0089193 A1* | 4/2011 | Minegishi | B05C 17/00583 222/102 |
| 2014/0246824 A1* | 9/2014 | Fiegener | B25B 1/2457 269/265 |
| 2015/0246431 A1* | 9/2015 | Shute | B25B 5/163 144/195.4 |
| 2022/0355742 A1* | 11/2022 | Kain | B60R 9/0485 |

OTHER PUBLICATIONS

Webpage for Dreambaby Sliding Locks, available at https://www.dream-baby.com/sliding-locks-3-pack.html, last accessed May 3, 2022, 3 pages.

* cited by examiner

DEVICE AND METHOD FOR SECURING A LADDER TO A LADDER RACK

CROSS-REFERENCE TO RELATED APPLICATIONS

This application claims priority to pending U.S. Provisional Application Ser. No. 63/184,491, filed May 5, 2021, the contents of which are incorporated herein by reference in its entirety.

FIELD OF THE INVENTION

This invention relates to devices and methods for securing ladders to a ladder rack on a vehicle.

BACKGROUND OF THE DISCLOSURE

Many workers (roofers, electricians, etc.) need to transport one or more ladders to and from worksites. As seen in FIG. 5, it is well known to mount a ladder rack 42 to a vehicle 40 (typically a pickup truck). There are many types of ladder racks, but they typically have horizontal crossbars 44 upon which one or more ladders 46 may be laid.

The ladders should be appropriately secured to the ladder rack for safety, as well as to prevent theft. Because the ladders on top of a ladder rack are high off the ground, it can be difficult to attach one or more securing devices (e.g., straps) over and around the ladders and the crossbar(s).

BRIEF SUMMARY OF THE DISCLOSURE

In one embodiment of the invention, a device for securing equipment to a rack comprises a first pole segment, a second pole segment, a connecting segment, a handle, and a clamping bar. The first pole segment is straight and has a length. The second pole segment is substantially parallel to the first pole segment, is straight, and has a length. The length of the first pole segment is greater than the length of the second pole segment. The connecting segment connects a distal end of the first pole segment and a distal end of the second pole segment. The handle is affixed to a proximal end of the first pole segment. The clamping bar is slidably engaged with the first pole segment and selectively slidably engaged with the second pole segment. The clamping bar comprises a trigger handle pivotable from a first position to a second position, a walking plate pivotable in conjunction with the trigger handle from a first position to a second position, a first biasing spring biasing the walking plate, and thereby the trigger handle, into their respective first positions, a release bar pivotable from a first position to a second position, and a second biasing spring biasing the release bar into its first position. The trigger handle defines a hole through which the first pole segment passes. The walking plate defines a hole through which the first pole segment passes. The release bar defines a hole through which the first pole segment passes.

Pivoting the trigger handle and thereby the walking plate from their respective first positions to their respective second positions causes an edge of the hole in the walking plate to apply sufficient pressure against the first pole segment such that the walking plate and the first pole segment move in unison, thereby moving the clamping bar proximally-to-distally along the first pole segment such that the clamping bar moves closer to the connecting segment. Repeatedly pivoting and releasing the trigger handle moves the clamping bar proximally-to-distally along the first pole segment such that the clamping bar slidably engages a proximal end of the second pole segment. When the release bar is in its first position, an edge of the hole in the release bar applies sufficient pressure against the first pole segment such that movement of the first pole segment relative to the release bar is inhibited in at least one direction, thereby inhibiting movement of the clamping bar along the first pole segment in at least one direction. When the release bar is in its second position, the edge of the hole in the release bar applies no pressure or less pressure than when the release bar is in its first position against the first pole segment such that movement of the first pole segment relative to the release bar is not inhibited, thereby allowing movement of the clamping bar along the first pole segment in either direction. The clamping bar is selectively rotatable about the first pole segment when the clamping bar is not engaged with the second pole segment.

The clamping bar may comprise a central hub through which the first pole segment passes, a first arm projecting outward from the central hub, and a second arm projecting from the first arm in a direction substantially parallel to the second pole segment. The clamping bar may be selectively slidably engageable with the second pole segment via the second arm. The second arm may define a through-hole into which the proximal end of the second pole segment enters when the clamping bar slidably engages with the second pole segment.

The device may further comprise a selectively pivotable latching arm for selectively engaging a pin on the trigger handle when the trigger handle is in its second position, such that the trigger handle and the walking plate are retained in their respective second positions. When the walking plate is retained in its second position, the walking plate applies sufficient pressure against the first pole segment such that movement of the first pole segment relative to the release bar is inhibited.

The latching arm may be selectively pivotable via a selectively insertable key.

The first pole segment and the second pole segment may be cylindrical.

The connecting segment may be cylindrical.

The first pole segment, the second pole segment, and the connecting segment may comprise a single, unitary pipe.

The connecting segment may be curved.

The second biasing spring may comprise a compression spring.

In addition to the device for securing equipment to a rack described herein, other embodiments of the invention comprise corresponding methods for securing equipment to a rack using the device described herein.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings.

DETAILED DESCRIPTION OF THE DISCLOSURE

Figure 1:
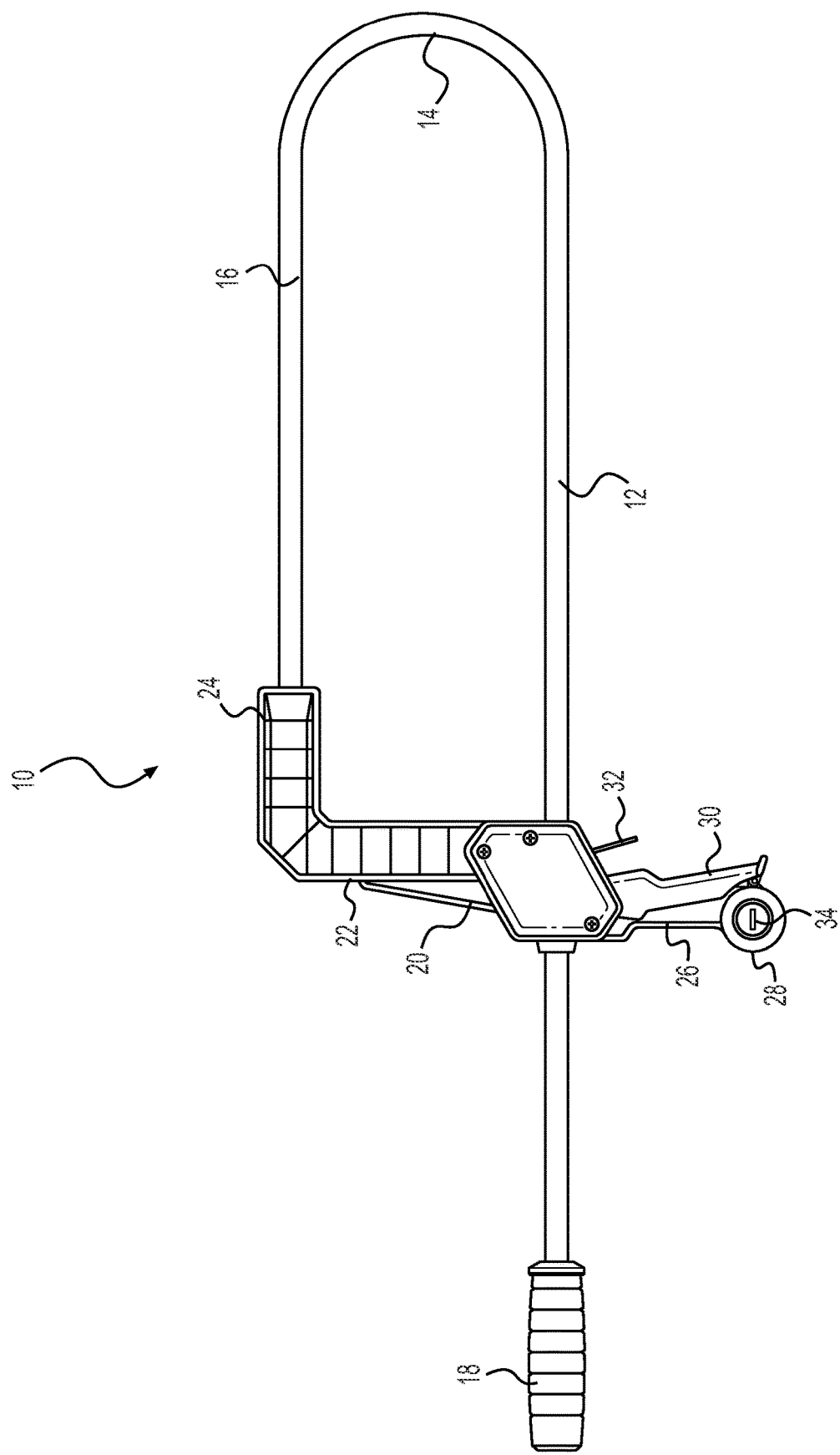
FIG. 1 is a side view of a device for securing a ladder to a ladder rack, in a closed position, in accordance with embodiments of the present invention.

Certain terminology is used in the following description for convenience only and is not limiting. The words "lower," "bottom," "upper," "top," and the like designate directions in the drawings to which reference is made. The words "inwardly," "outwardly," "upwardly," "downwardly," and the like refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the invention comprise a device and method for securing one or more ladders (or other suitable tool or piece of equipment) to any suitable vehicle rack upon which equipment, tools, etc. are routinely mounted and preferably secured. The device of embodiments of the invention provides a novel way of securing one or more ladders to a vehicle rack in a manner that is safe, secure, and easy to set up and remove. While embodiments of the invention are described and illustrated herein as devices and methods for securing a ladder to a ladder rack, devices and methods of embodiments of the invention may be used to secure other types of tools and equipment to other types of vehicle-mounted or non-vehicle-mounted racks.

As seen in FIGS. 1-4, the ladder securing device 10 comprises an elongated first post 12, a second post 16 that is substantially parallel to and shorter than the first post 12, and a connecting bar 14 joining the top ends of the first and second posts. The first post 12, the second post 16, and the connecting bar 14 are constructed of any suitable material that is rigid, strong, durable, and weather-resistant, such as any suitable metal (e.g., aluminum or stainless steel).

A clamping bar 20 is slidably engaged with the first post 12 and selectively slidably engaged with the second post 16. The clamping bar 20 comprises a main hub 21 through which the first post 12 is slidably engaged. An arm extends from the hub 21. In the illustrated embodiment, the arm comprises a perpendicular portion 22 (so termed because the perpendicular portion 22 is substantially perpendicular to the first post 12 and the second post 16) and a parallel portion 24 (so termed because the parallel portion 24 is substantially parallel to the first post 12 and the second post 16). The parallel portion 24 has a through-hole 30. It is the parallel portion 24 that is selectively slidably engageable with the second post 16, as described below. The hub 21 and the arm 22, 24 are constructed of any suitable material that is rigid, strong, durable, and weather-resistant, such as any suitable metal (e.g., aluminum or stainless steel) or any suitable plastic.

The clamping bar 20 features a squeeze-to-advance/ quick-release mechanism that comprises a fixed handle 26, a movable handle 30 that is pivotable toward the fixed handle 26 when squeezed by a user and biased away from the fixed handle by a biasing spring 54 (which may comprise a compression spring) (or any other suitable biasing mechanism), and a pivotable release bar 32. When the movable handle 26 is squeezed by a user, a pivotable walking plate 52 pivots in unison. The movable handle 26 and the walking plate 52 both have holes through which the first post 12 passes. The hole in the walking plate 52 is only slightly larger in diameter than is the first post 12 (in the illustrated embodiment, the first post 12 has a diameter of 0.50 inches and the diameter of the hole in the walking plate 52 is 0.51 inches). In a manner identical or nearly so to a quick-release woodworking trigger clamp, the clamping bar 20 is mechanically advanced along the first post 12 toward the connecting bar 14 by grasping the handles 26, 30 and squeezing the movable handle 30 toward the fixed handle 26. The pivoting movement of the movable handle 30 pivots the walking plate 52 such that the top and bottom edges of hole in the walking plate 52 (top is toward the proximal end 50 of the movable handle 30 and bottom is toward the distal end) press into the first post 12, applying sufficient pressure to draw the first post 12 through the hub 21 such that the clamping bar 20 moves along the first post 12 toward the connecting bar 14 (this is the movement to secure the device 10 to a ladder rack and ladders, as described below).

The release bar 32 has a hole through which the first post 12 passes. The hole in the release bar 32 is only slightly larger in diameter than is the first post 12 (in the illustrated embodiment, the first post 12 has a diameter of 0.50 inches and the diameter of the hole in the release bar 32 is 0.51 inches). A biasing spring 56 (in the illustrated embodiment, as stacked wave disc spring (also called a wave spring) is used, but any other suitable type of spring may be used) (or any other suitable biasing mechanism) biases the release bar 32 forward (i.e., away from the movable handle 30 and toward the connecting bar 20). When the release bar 32 is biased forward, the top and bottom edges of hole in the release bar 32 (top is toward the proximal end (i.e., the end enclosed within the structure of the clamping bar) of the release bar 32 and bottom is toward the distal end (i.e., the end outside of the structure of the clamping bar)) press into the first post 12 and thereby resist movement of the first post 12 relative to the clamping bar 20. This pressure is sufficient to be effective at resisting movement of the clamping bar 20 away from the connecting bar 14 but it is typically possible for a user to move the clamping bar 20 toward the connecting bar 14 as it is only necessary to overcome the resistance of the biasing spring 56. To move the clamping bar 20 away from the connecting bar 14, the release bar 32 is depressed toward the fixed handle 26 and held in the depressed position (thereby aligning the hole in the release bar 32 with the first post 12 and removing the applied pressure) to enable the clamping bar 20 to be freely slid along the first post 12 toward the connecting bar 14 or away from the connecting bar 14.

Figure 2:
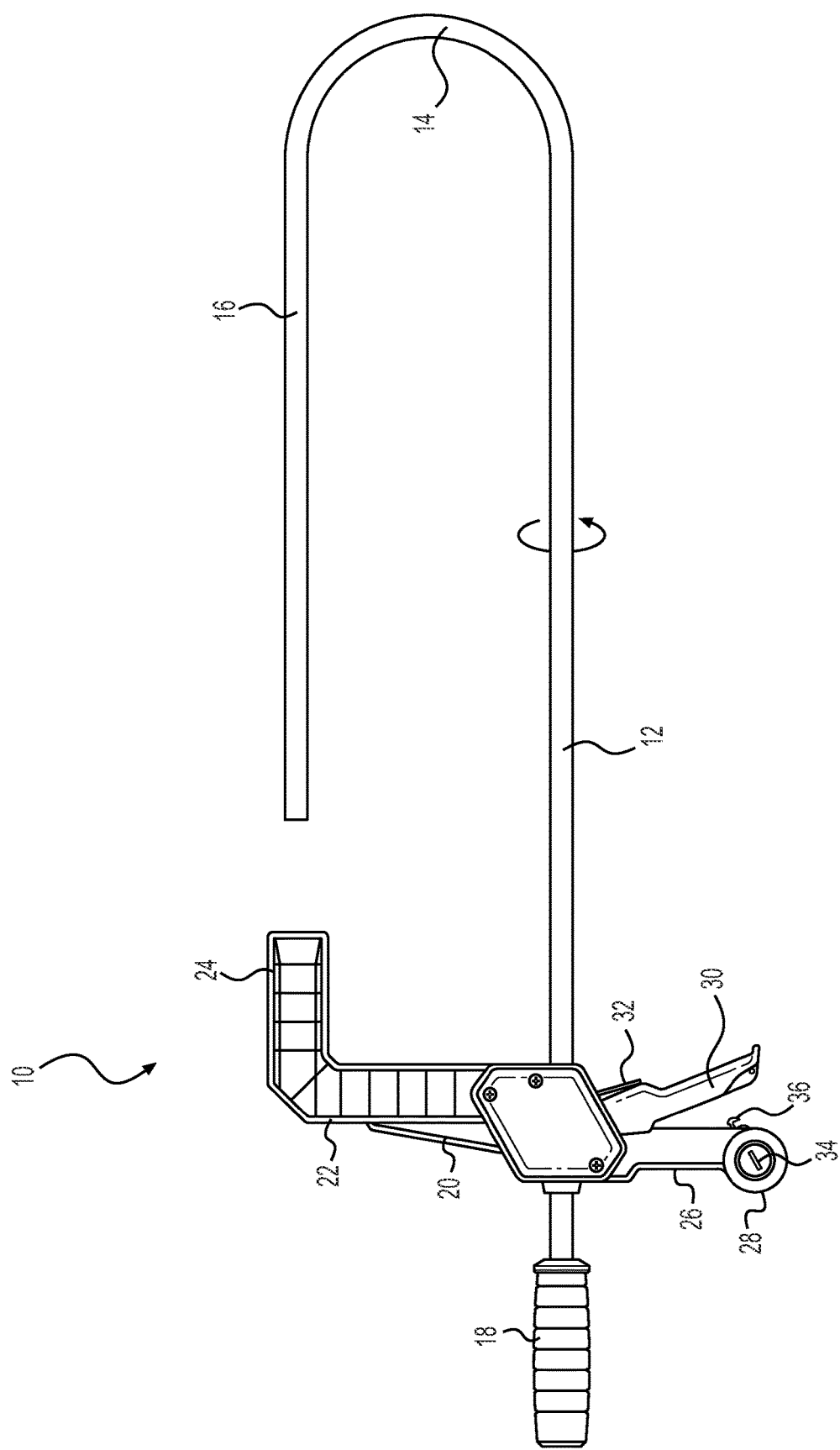
FIG. 2 is a side view of the device of FIG. 1, in an open position.
Figure 3:
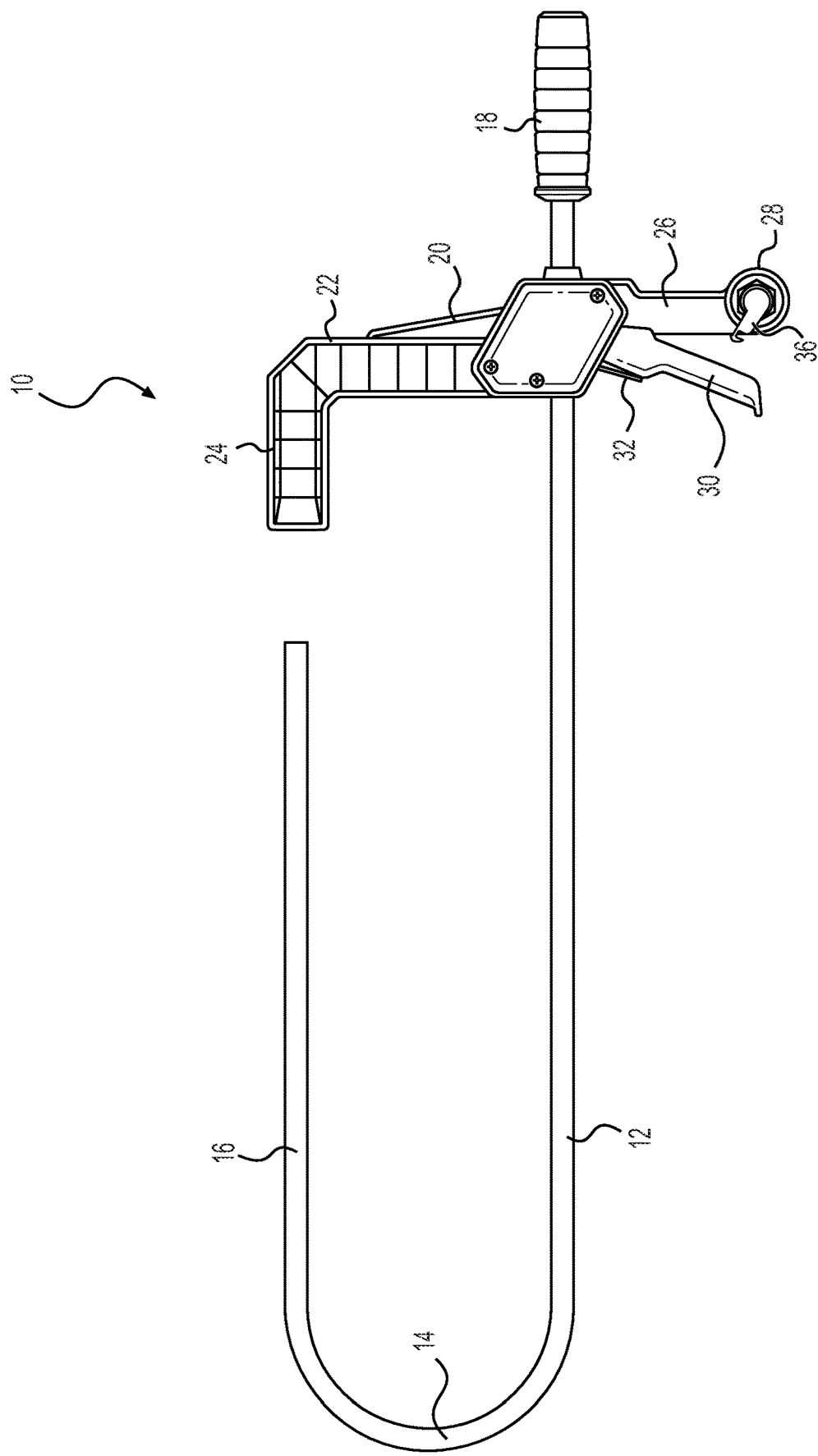
FIG. 3 is an opposite side view of the device of FIG. 1, in an open position.
Figure 4:
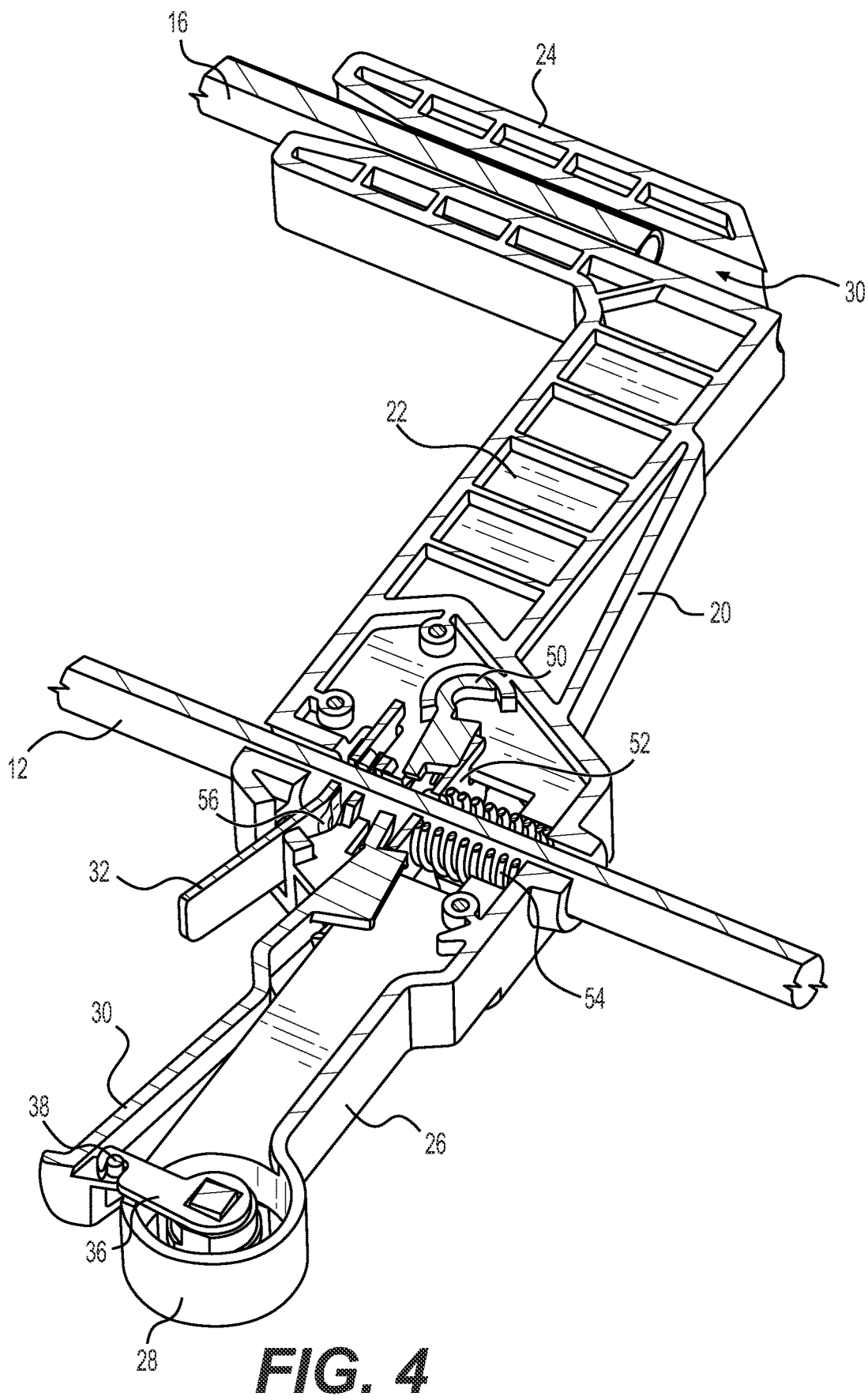
FIG. 4 is a perspective sectional view of the clamping mechanism of the device of FIG. 1.
Figure 5:
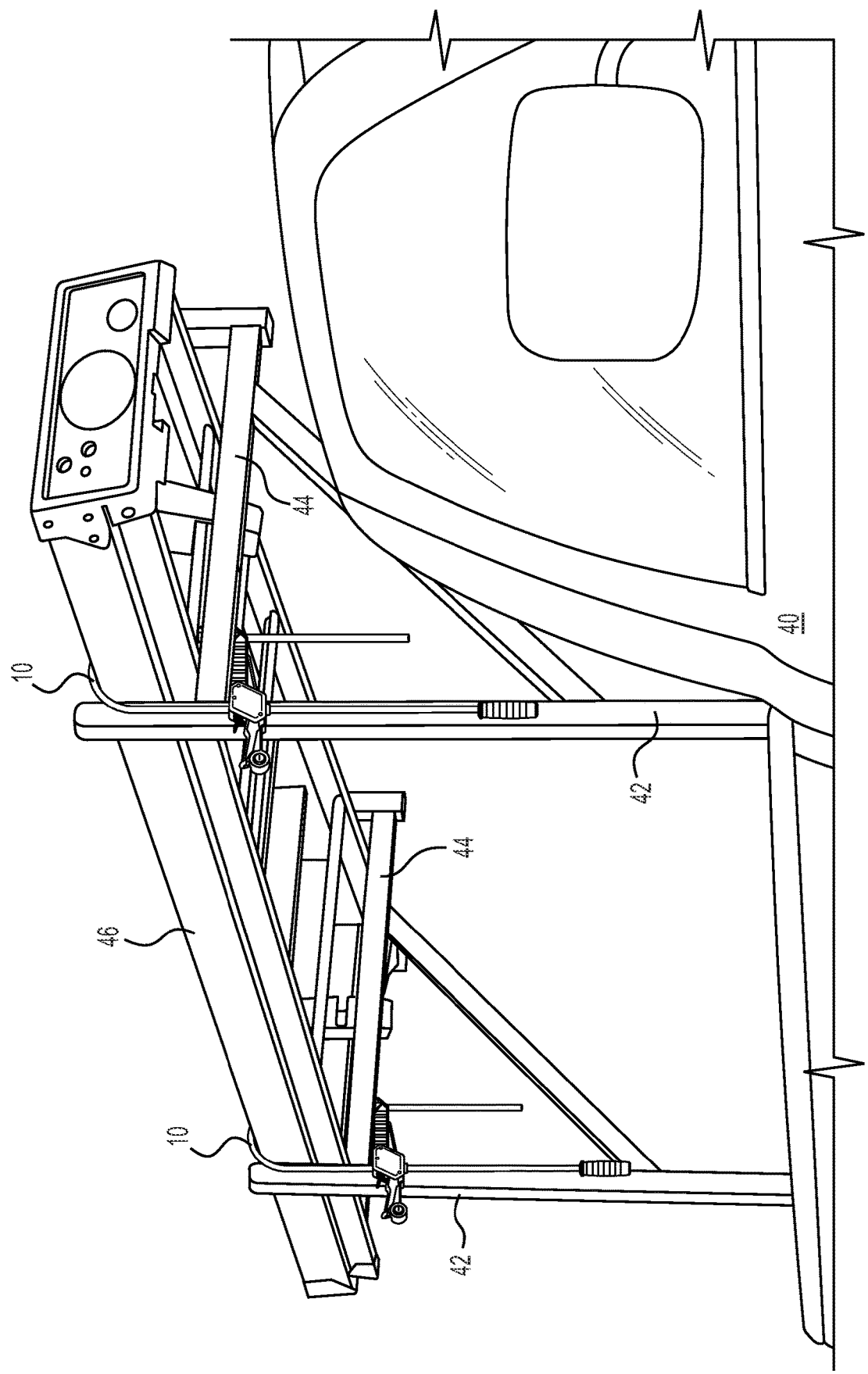
FIG. 5 shows a ladder rack on a truck, and a ladder on the ladder rack.

A locking mechanism 28 comprises a pivoting latch arm 36 that is selectively movable between a locked position (best seen in FIG. 4) and an unlocked position (best seen in FIGS. 2 and 3). In the locked position, a hook at the distal end of the latch arm 36 engages with a pin 38 in the movable handle 30. To lock the device, a key (not illustrated) is inserted into keyhole 34, the movable handle 30 is depressed, and the key is turned to pivot the latch arm 36 into the locked position engaging the pin 38. This holds the movable handle 30 in the depressed position, which holds the walking plate 52 in position in which the top and bottom edges of the hole apply pressure against the first post 12 which in turn prevents the clamping bar 20 from moving relative to the first and second posts 12, 16. The key would be removed to prevent unauthorized removal of the device.

To unlock the device, the key is inserted into the keyhole 34 and turned to pivot the latch arm 36 into the unlocked position, which disengages the pin 38 and allows the movable handle 30 and the walking plate 52 to return to its neutral position away from the fixed handle 26. The locking mechanism 28 (or any other suitable locking mechanism) prevents the clamping bar 20 from sliding off the lower end of the second post 16 (when engaged as described below), thereby ensuring that the device 10 stays in its securing position relative to the ladder rack and ladder. Using such a locking mechanism helps prevent an unauthorized person from removing the device 10 and thereby removing the ladder(s).

The first post 12, connecting bar 14, and second post 16 are labeled as three separate components, however, these components are preferably formed as a unitary, cylindrical component that is generally J-shaped. Such a cylindrical cross-section would enable the clamping bar 20 to rotate about the first post (as indicated by the circular arrow in FIG. 2) to move the clamping bar 20 out of the way to better facilitate placement of the device into its securing position. In an alternative embodiment of the invention (not illustrated) the first post, connecting bar, and second post are formed as separate components joined at right angles.

The first and second posts should be parallel or nearly so (no more than two degrees from parallel, and preferably no more than one degree from parallel) to ensure that the clamping bar can properly slidably engage both the first and second posts.

The first post 12 is longer than the second post for at least two reasons: (1) a user can grasp the device by handle 18 at the lower (proximal) end of the first post 12 and raise the device high enough to enable the lower (proximal) end of the second post 16 to rise above the ladders for placement of the device (described further below), and (2) the clamping bar 20 can slide off the second post 16 but remain slidably engaged with the first post 12.

To use the device to secure one or more ladders to a ladder rack, the release bar 32 is depressed to enable the clamping bar 20 to freely slide along the first post 12 and the clamping bar 20 is slid toward the lower (proximal) end of the first post 12 such that the clamping bar 20 disengages from the second post 16 (if initially engaged). Typically, the clamping bar 20 will then be rotated approximately 30-180 degrees away from its position when the parallel portion 24 is aligned with the second post 16 to ensure that the clamping bar 20 is not blocking access to the space between the first and second posts, although it may not be necessary to rotate the clamping bar that much in all instances. Standing by the side of the vehicle and near one of the crossbars of the ladder rack, the user grasps the handle 18 and lifts the device 10 up until the lower (proximal) end (the end opposite the connecting bar 14) of the second post 16 is higher than the topmost side of the ladder 46 (or of the topmost ladder if multiple ladders are stacked on the ladder rack). The user then moves the device 10 toward the ladder(s) 46 until the lower end of the second post 16 is past the ladder side rail that is closer to the user. The user rotates the device 10 slightly such that the connecting bar 14 crosses over the ladder rack crossbar 44. The user then lowers the device 10 such that the lower end of the second post 16 is lowered through the ladder(s) 46 and a portion of both the ladder side rail and the ladder rack crossbar 44 enter the space between the first and second posts. The user continues to lower the device 10 until the connecting bar 14 contacts the topmost side of the ladder side rail. The user then rotates the clamping bar 20 back toward the second post 16, depresses the release bar 32 (this may not be necessary), and slides the clamping bar 20 upward such that the parallel portion 24 of the clamping bar 20 engages (or re-engages, previously engaged) the second post 16. The user continues to slide the clamping bar 20 upward until the clamping bar 20 contacts the underside of the ladder rack crossbar (alternatively, the user could use the handle 30 to advance the clamping bar 20 into this position, but it is easier to use the release bar 32 instead). The user then squeezes the handle 30 one or more times to tighten the clamping bar 20 upward against the underside of the ladder rack crossbar, which also tightens the connecting bar 14 downward against the ladder(s) and squeezes the ladder(s) against the crossbar, thereby holding the ladder(s) securely in the ladder rack. This type of clamping mechanism is able to produce a significant amount of clamping force to securely hold the ladder(s) in place on the ladder rack. To prevent the device 10 from opening up and possibly dislodging, with the handle 30 depressed and the key inserted into the keyhole, the user turns the key to engage the latch arm 36 with the pin 38. The user would then typically remove the key until it is time to unlock and remove the device. There are other steps and other orders of steps that may be performed to use the device to secure one or more ladders to a ladder rack, as long as at least a part of the ladder and at least a part of the ladder rack are secured within the space between the first and second posts.

The device may be any suitable size, depending on the number and size of ladders to be secured. In one exemplary embodiment, the first post is about 32 inches long, the second post is about 18 inches long, and the distance between the first and second posts is about 8 inches, and the first, second, and connecting posts are constructed from a single piece of stainless-steel tubing (e.g., grade A240 304).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below (if any) are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A device for securing equipment to a rack, the device comprising:
   a first pole segment, the first pole segment being straight and having a length;
   a second pole segment substantially parallel to the first pole segment, the second pole segment being straight and having a length, the length of the first pole segment being greater than the length of the second pole segment;

a connecting segment connecting a distal end of the first pole segment and a distal end of the second pole segment;

a handle affixed to a proximal end of the first pole segment; and a clamping bar slidably engaged with the first pole segment and selectively slidably engaged with the second pole segment, the clamping bar comprising:

a trigger handle pivotable from a first position to a second position, the trigger handle defining a hole through which the first pole segment passes;

a walking plate pivotable in conjunction with the trigger handle from a first position to a second position, the walking plate defining a hole through which the first pole segment passes;

a first biasing spring biasing the walking plate, and thereby the trigger handle, into their respective first positions;

a release bar pivotable from a first position to a second position, the release bar defining a hole through which the first pole segment passes; and a second biasing spring biasing the release bar into the first position;

wherein pivoting the trigger handle and thereby the walking plate from their respective first positions to their respective second positions causes an edge of the hole in the walking plate to apply sufficient pressure against the first pole segment such that the walking plate and the first pole segment move in unison, thereby moving the clamping bar proximally-to-distally along the first pole segment such that the clamping bar moves closer to the connecting segment;

wherein repeatedly pivoting and releasing the trigger handle moves the clamping bar proximally-to-distally along the first pole segment such that the clamping bar slidably engages a proximal end of the second pole segment;

wherein, when the release bar is in the first position, an edge of the hole in the release bar applies sufficient pressure against the first pole segment such that movement of the first pole segment relative to the release bar is inhibited in at least one direction, thereby inhibiting movement of the clamping bar along the first pole segment in at least one direction;

wherein, when the release bar is in the second position, the edge of the hole in the release bar applies no pressure or less pressure than when the release bar is in the first position against the first pole segment such that movement of the first pole segment relative to the release bar is not inhibited, thereby allowing movement of the clamping bar along the first pole segment in either direction; and wherein the clamping bar is selectively rotatable about the first pole segment when the clamping bar is not engaged with the second pole segment.

2. The device of claim 1, wherein the clamping bar comprises:

a central hub through which the first pole segment passes;

a first arm projecting outward from the central hub; and a second arm projecting from the first arm in a direction substantially parallel to the second pole segment;

wherein the clamping bar is selectively slidably engageable with the second pole segment via the second arm; and wherein the second arm defines a through-hole into which the proximal end of the second pole segment enters when the clamping bar slidably engages with the second pole segment.

3. The device of claim 1, further comprising a selectively pivotable latching arm for selectively engaging a pin on the trigger handle when the trigger handle is in the position, such that the trigger handle and the walking plate are retained in their respective second positions; and wherein, when the walking plate is retained in the second position, the walking plate applies sufficient pressure against the first pole segment such that movement of the first pole segment relative to the release bar is inhibited.

4. The device of claim 3, wherein the latching arm is selectively pivotable via a selectively insertable key.

5. The device of claim 1, wherein the first pole segment and the second pole segment are cylindrical.

6. The device of claim 5, wherein the connecting segment is cylindrical.

7. The device of claim 6, wherein the first pole segment, the second pole segment, and the connecting segment comprise a single, unitary pipe.

8. The device of claim 1, wherein the connecting segment is curved.

9. The device of claim 1, wherein the second biasing spring comprises a compression spring.

10. A method of securing a ladder to a vehicle rack, the method comprising: obtaining a device for securing a ladder to a vehicle rack, the device comprising:

(a) a first pole segment, the first pole segment being straight and having a length;

(b) a second pole segment substantially parallel to the first pole segment, the second pole segment being straight and having a length, the length of the first pole segment being greater than the length of the second pole segment;

(c) a connecting segment connecting a distal end of the first pole segment and a distal end of the second pole segment;

(d) a handle affixed to a proximal end of the first pole segment; and (e) a clamping bar slidably engaged with the first pole segment and selectively slidably engaged with the second pole segment, the clamping bar comprising:

(A) a trigger handle pivotable from a first position to a second position, the trigger handle defining a hole through which the first pole segment passes;

(B) a walking plate pivotable in conjunction with the trigger handle from a first position to a second position, the walking plate defining a hole through which the first pole segment passes;

(C) a first biasing spring biasing the walking plate, and thereby the trigger handle, into their respective first positions;

(D) a release bar pivotable from a first position to a second position, the release bar defining a hole through which the first pole segment passes; and (E) a second biasing spring biasing the release bar into the first position;

wherein pivoting the trigger handle and thereby the walking plate from their respective first positions to their respective second positions causes an edge of the hole in the walking plate to apply sufficient pressure against the first pole segment such that the walking plate and the first pole segment move in unison, thereby moving the clamping bar proximally-to-distally along the first pole segment such that the clamping bar moves closer to the connecting segment;

wherein repeatedly pivoting and releasing the trigger handle moves the clamping bar proximally-to-distally along the first pole segment such that the clamping bar slidably engages a proximal end of the second pole segment;

wherein, when the release bar is in the first position, an edge of the hole in the release bar applies sufficient pressure against the first pole segment such that movement of the first pole segment relative to the release bar is inhibited in at least one direction, thereby inhibiting movement of the clamping bar along the first pole segment in at least one direction;

wherein, when the release bar is in the second position, the edge of the hole in the release bar applies less pressure than when the release bar is in the first position against the first pole segment such that movement of the first pole segment relative to the release bar is not inhibited, thereby allowing movement of the clamping bar along the first pole segment in either direction; and wherein the clamping bar is selectively rotatable about the first pole segment when the clamping bar is not engaged with the second pole segment;

disengaging the clamping bar and the second pole segment;

rotating the clamping bar from the position in which the clamping bar and the second pole segment were slidably engaged;

positioning the device relative to the ladder and the vehicle rack such that a portion of the ladder and a portion of the vehicle rack is positioned in a space between the first and second pole segments;

rotating the clamping bar such that the clamping bar is aligned to slidably engage the second pole segment;

sliding the clamping bar along the first pole segment until the clamping bar has slidably engaged the second pole segment and the clamping bar is contacting the vehicle rack; and moving the trigger handle from the first position to the second position one or more times to tighten the clamping bar against the vehicle rack.

11. The method of claim 10, wherein the clamping device comprises a selectively pivotable latching arm for selectively engaging a pin on the trigger handle when the trigger handle is in the second position, such that the trigger handle and the walking plate are retained in their respective second positions;

wherein the method further comprises, while the trigger handle is in the second position, pivoting the latching arm such that the latching arm engages the pin on the trigger handle and such that the trigger handle and the walking plate are retained in their respective second positions; and wherein, when the walking plate is retained in the second position, the walking plate applies sufficient pressure against the first pole segment such that movement of the first pole segment relative to the release bar is inhibited.

12. The method of claim 11, wherein the latching arm is selectively pivotable via a selectively insertable key.

13. The method of claim 10, wherein the clamping bar of the device comprises: a central hub through which the first pole segment passes;

a first arm projecting outward from the central hub; and a second arm projecting from the first arm in a direction substantially parallel to the second pole segment;

wherein the clamping bar is slidably engageable with the second pole segment via the second arm; and wherein the second arm defines a through-hole into which the proximal end of the second pole segment enters when the clamping bar slidably engages with the second pole segment.

14. The method of claim 10, wherein the first pole segment and the second pole segment of the device are cylindrical.

15. The method of claim 14, wherein the connecting segment of the device is cylindrical.

16. The method of claim 15, wherein the first pole segment, the second pole segment, and the connecting segment of the device comprise a single, unitary pipe.

17. The method of claim 10, wherein the connecting segment of the device is curved.

18. The method of claim 10, wherein the second biasing spring of the device comprises a wave spring.

* * * * *